Figure 1A:
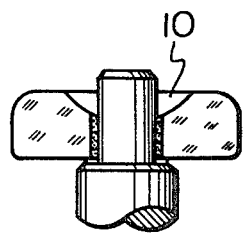

United States Patent [19]

Yamada

[11] 4,204,874
[45] May 27, 1980

[54] LIGHT-TRANSMITTING, POLYCRYSTALLINE ALUMINA BODY AND METHOD FOR PRODUCING THE SAME

[75] Inventor: Shigetaka Yamada, Tokyo, Japan

[73] Assignee: Citizen Watch Company Limited, Tokyo, Japan

[21] Appl. No.: 964,312

[22] Filed: Nov. 28, 1978

[30] Foreign Application Priority Data

Dec. 2, 1977 [JP] Japan ................... 52-144730

[51] Int. Cl.² ............................................. C04B 35/10
[52] U.S. Cl. ....................................... 106/73.4; 106/42
[58] Field of Search ........................... 106/73.4, 65, 42; 264/65, 63

[56] References Cited

U.S. PATENT DOCUMENTS

| Re. 27,083 | 3/1971 | Klinger et al. | 106/73.4 |
|---|---|---|---|
| 3,026,210 | 3/1962 | Coble | 106/73.4 |
| 3,769,049 | 10/1973 | Mutz et al. | 106/73.4 |
| 3,802,893 | 4/1974 | Kiger et al. | 106/73.4 |
| 3,834,915 | 9/1974 | Cleveland et al. | 106/73.4 |
| 3,905,845 | 9/1975 | Kobayashi et al. | 106/73.4 |
| 4,031,177 | 6/1977 | Auriol et al. | 106/65 |

Primary Examiner—Delbert E. Gantz
Assistant Examiner—Mark Bell
Attorney, Agent, or Firm—Frank J. Jordan

[57] ABSTRACT

A light-transmitting crystalline alumina body which consists of $\alpha$-$Al_2O_3$ containing 0.1 to 1.0 weight percent of strontium oxide. A method for producing an alumina body comprises preparing a mixture of finely divided alumina powder with 0.1 to 1.0 weight percent of finely divided powder of strontium oxide, pressing the mixture to form a compact, prefiring the compact at a temperature at about 1100° C. in an oxygen containing atmosphere, and firing the prefired compact at a temperature of about 1650° C. in an environment selected from the group consisting of vacuum and hydrogen.

3 Claims, 10 Drawing Figures

LIGHT-TRANSMITTING, POLYCRYSTALLINE ALUMINA BODY AND METHOD FOR PRODUCING THE SAME

This invention relates to the manufacture of high density, light-transmitting polycrystalline bodies of alumina having improved hardness, and to methods for forming such alumina bodies.

As is widely known a ruby consists of alpha-alumina ($\alpha$-$Al_2O_3$) in which a small amount of chrome oxide ($Cr_2O_3$) is incorporated as a solid solution. A ruby of this type, owing to the fact that it is light-transmitting, attractive and extremely hard, finds wide use in bearings as well as ornaments. However, rubies employed as bearings are mainly of the synthetic variety; few natural rubies are used for this purpose.

The synthesis of precious stones such as rubies is usually carried out by a flame spray coating process (known as the Verneuil process). According to this process an inverted oxyhydrogen burner is used to melt a raw material powder in small quantities so as to form an accumulation on a supporting platform. In this way a single crystal of alpha-alumina ($\alpha$-$Al_2O_3$) is allowed to grow. Although 400 to 500 karats of a stalacti-formed Boule can usually be obtained in a single step, it is difficult to mass produce a ruby of any desired shape.

It is, therefore, an object of the present invention to provide a high density, polycrystalline body of alumina which is extremely hard, light transmitting and lustrous.

It is another object of the present invention to provide a polycrystalline body of alumina containing small additions of a grain growth retarding agent or inhibitor to prevent grain boundary cracking and thereby reduce scattering of light rays passing through said body.

It is another object of the present invention to provide a polycrystalline body of alumina which can be employed in lieu of ruby in the fabrication of a small-sized bearing for use in precision machinary such as timepieces.

It is still another object of the present invention to provide a polycrystalline body of alumina which can be freely adjusted in color tone from pale rose pink to deep crimson and is thus utilizable as an ornament such as pendant or broach.

Figure 2:
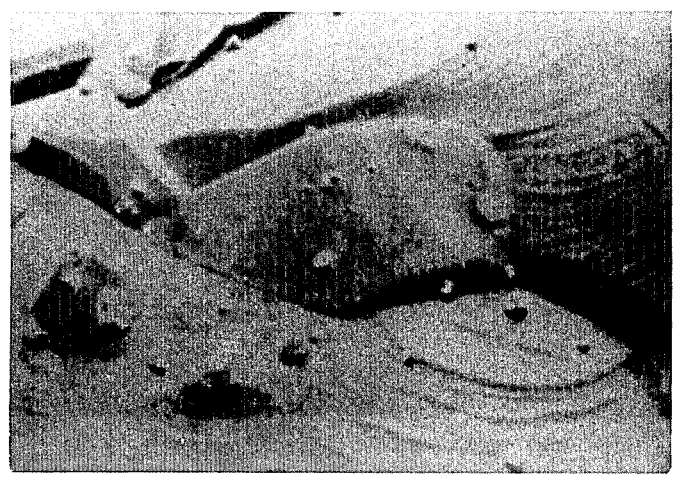
Figure 2:
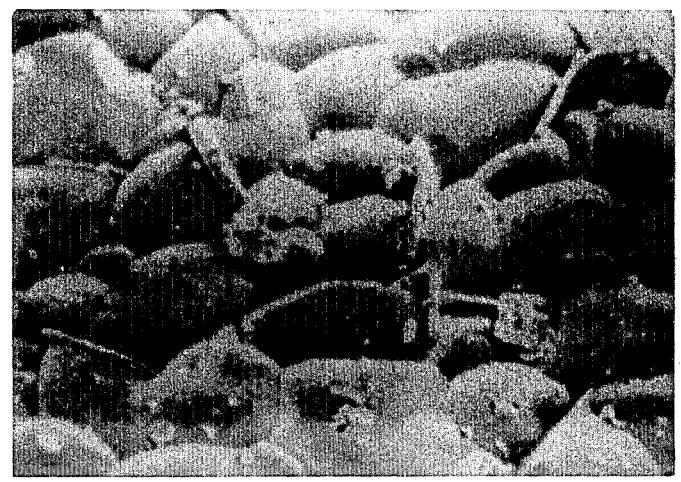
Figure 3:
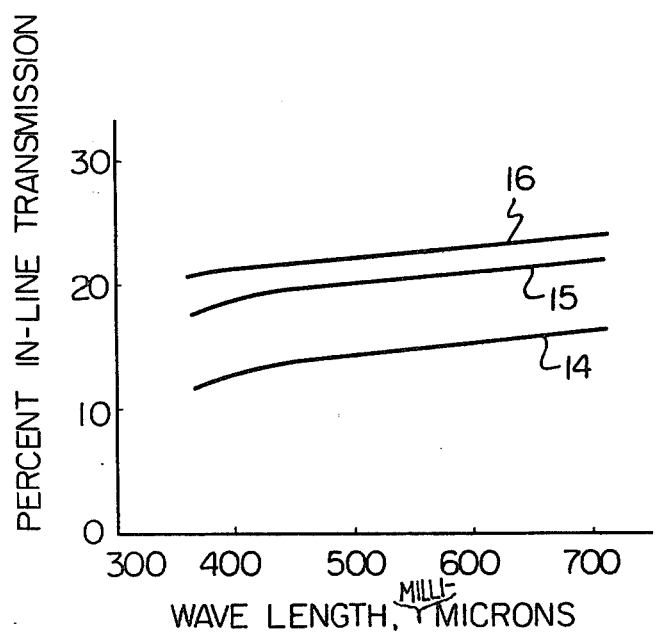

These and other objects, features and advantages of the present invention will become more apparent from the following description when taken in conjunction with the accompanying drawings, in which:

FIGS. 1A, 1B, 1C, 1D, 1E, 1F, and 1G, are cross-sectional views of conventional miniature bearing configurations for use in timepieces or the like;

FIG. 2A shows the size of conventional alumina crystals as photographed by an electron microscope and FIG. 2B shows a similar photograph of alumina crystals manufactured in accordance with the present invention; and FIG. 3 is a graph showing the relation between light transmittance and wavelength in accordance with both the prior art and preferred embodiments according to the present invention.

Referring now to FIGS. 1A through 1G, there is shown examples of a number of configurations for timepiece bearings.

Figure 1B:
Figure 1C:
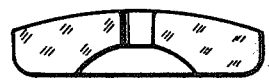
Figure 1D:
Figure 1E:
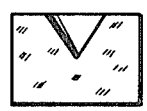
Figure 1F:
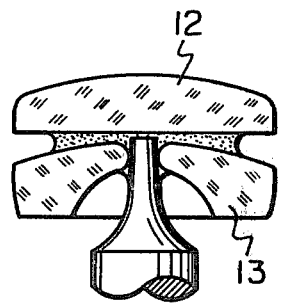
Figure 1G:
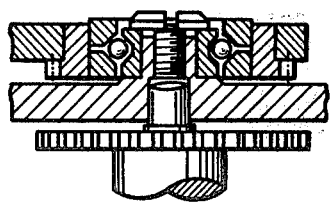

FIG. 1A is a cross-sectional view of a flat jewel hole having an oil reservoir. FIG. 1B is a cross-sectional view of an olive hole. FIG. 1C is a cross-sectional view of a domed jewel. FIG. 1D is a cross-sectional view of a large jewel hole. FIG. 1E is a cross sectional view of a V-hole jewel. FIG. 1F is a cross-sectional view of a bearing structure obtained by combining an end stone 12 and a jewel hole 13, and FIG. 1G is a cross-sectional view of a bearing for a self-winding weight in which balls are fabricated from a ruby.

FIGS. 1A through 1G illustrates the typical ruby configurations of which the dimensions are generally quite minute. In the case of a jewel hole, for example, the outside diameter is usually 0.6 to 2.5 mm and the thickness 0.15 to 1.0 mm. From 7 to 23 jewels are normally employed in a single timepiece and all are cut from a rough gemstone, machined and polished. This process is complicated and requires a large amount of labor and high cost.

On the other hand, however, the application of the so-called powder molding process makes it comparatively easy to mold the configurations shown in FIGS. 1A through 1G through the use of alumina powder and enables post-processing such as polishing to be greatly curtailed since the final product can be provided with dimensions which are extremely close to those prescribed. Nevertheless, an item molded in this fashion is generally white and non-transparent and cannot be used as a bearing in a timepiece or the like.

The non-transparency of an ordinary alumina sintered body is primarily attributable to the presence of a large number of pores or voids within the sintered body and is also due to the fact that the incorporation of optically anisotropic impurities together with the alumina causes the dispersion and reflection of light. The influence of the pores is particularly great. The formation of the pores or voids results from the fact that the growth of the alumina particles at the firing step is rapid so that gas contained in the particles is entrapped in the final product. Moreover, impurities within the powder body tend to segregate and concentrate about the vicinity of the pores or voids. Accordingly, a light-transmitting sintered body of alumina can be prepared by using a fine, high-purity alumina powder to reduce the impurity content, and by suppressing the formation of pores or voids through inhibiting the growth of the particles at the time of calcination.

According to a recently developed process, such as disclosed in a U.S. Pat. No. 3,026,210 not more than 0.5 wt % of magnesium oxide (MgO) is added as a particle growth inhibitor to a fine alumina powder of a high purity. The alumina is then compacted according to a customary method and then subjected to primary firing at a temperature of from 1000° to 1700° C. The product is subsequently subjected to secondary firing at a temperature of from 1800° to 1950° C. in a hydrogen atmosphere or in vacuum. This inhibits the particle growth and furnishes a light-transmitting article which is substantially free of pores. This process, however, requires the application of fairly high temperatures and necessitates that the amount of magnesium oxide must be held to substantially 0.1 wt % or less in order to improve transparency. It is known that the higher the magnesium oxide content the greater the strength of the alumina sintered body in general. A process has also been disclosed in which the magnesium oxide content is increased to as much as 10 wt % by regulating the rate of temperature increase during firing. This process, however, increases the amount of impurities which tends to reduce the in-line transmittance.

In another method, not more than 0.8 wt % of an element from the lanthanides family such as lanthanum (La) or yttrium (Y) is added together with magnisium oxide to lower the firing temperature and improve transparency.

Although each of these methods relates to rendering an alumina sintered body light transmissive, they are primarily applicable to an envelope of high voltage mercury arc lamps for illumination purposes. None of these methods can be applied to producing a red color or to the manufacture of bearings.

On the basis of experiments devoted mainly to such components as timepiece bearings the inventor has found that mixing small amounts of magnesium oxide and chrome oxide in high-purity alumina with the addition of a trace amount of strontium oxide (SrO) furnishes a light-transmitting polycrystal alumina product which has a good sintering property at a comparatively low firing temperature as well as the color tone and luster of a ruby.

Specifically, 0.1 to 1.0 wt % of strontium oxide was added to and uniformly mixed with a product obtained by mixing 0.04 to 1.5 wt % of magnesium oxide and 0.2 to 3.5 wt % of chrome oxide with high-purity fine alumina powder. The mixture was then granulated and pressed to form a compact of a prescribed shape, after which the compact was subjected to prefiring in a conventional electric oven at a temperature of at about 1000° C. The prefired compact was next subjected to secondary firing at a temperature of about 1600° C. in an electric oven through which ammonia cracked gas was passed, thereby furnishing a light-transmitting polycrystal alumina article substantially free of pores and voids while exhibiting the color tone and luster of a ruby.

A polycrystalline alumina body prepared according to the method of the present invention was subjected to X-ray analysis. It was found that the main result was $\alpha$-$Al_2O_3$(Trigonal). Although some anisotropy was detected it was not particularly great, and the lattice constant agreed favorably with the standard data for $\alpha$-$Al_2O_3$. It was also confirmed that the $Cr_2O_3$ was present in the $Al_2O_3$ entirely in the form of a solid solution. MgO was not detected by the X-ray analysis and was considered to exist in the $Al_2O_3$ in the form of a solid solution or to have formed spinel ($MgAl_2O_4$) on the $Al_2O_3$ particles. SrO was detected as a trace amount of $Sr_3Al_{32}O_{51}$. On the basis of these results it was possible to confirm that the alumina sintered body was a ruby aggregate.

Although the function of the strontium oxide SrO is not perfectly understood, it is clear from FIGS. 2A and 2B that it exhibits the effect of an alumina particle growth inhibitor. FIGS. 2A and 2B are photographs taken by a scanning type electron microscope, in which FIG. 2A shows a conventional product obtained by the addition of 2 wt % of $Cr_2O_3$ as a color producing reagent and 0.2 wt % of MgO as a particle growth inhibitor, and FIG. 2B shows a product embodying the present invention as obtained by the adition of 0.3 wt % of SrO along with the 2 wt % of $Cr_2O_3$ and 0.2 wt % of MgO. While the product containing only the MgO exhibits an average particle diameter of from 16 to 22 microns, the product added with the SrO has an average particle diameter of from 9 to 11 microns, thus confirming a two-fold increase in the particle growth inhibiting effect.

The light-transmitting property, particularly in-line transmittance, was measured by a spectrophotometer. The results are as shown in FIG. 3 which is a curve illustrating the transmittance-wavelength relation with the in-line transmittance plotted on the vertical axis in terms of percent and the expermental wavelengths plotted on the horizontal axis in terms of millimicrons. Curve 14 serves as a reference example for a case in which $\alpha$-alumina contains 0.1 wt % of MgO in addition to 2.01 wt % of $Cr_2O_3$; the transmittance is 12% and 16% at wavelengths of 340 m$\mu$ and 700 m$\mu$, respectively. Curve 15 represents a first embodiment of the present invention in which 2.01 wt % of $Cr_2O_3$, 0.21 wt % of MgO and 0.25 wt % of SrO are added to $\alpha$-alumina; the transmittance is 18% and 22% at wavelengths of 340 m$\mu$ and 700 m$\mu$, respectively. Curve 16 represents a second embodiment of the present invention in which 2.01 Wt % of $Cr_2O_3$, 0.22 wt % of MgO and 0.50 wt % of SrO are added to $\alpha$-alumina; the transmittance is 21% and 24% at the wavelengths of 340 m$\mu$ and 700 m$\mu$, respectively.

The thickness of the specimen was 0.43 mm, and the specific gravity was from 4.08 to 4.09 as measured by the Archimedean method using alcohol. The specific gravity of the $Sr_3Al_{32}O_{51}$ was 4.22. Using a Vickers hardness meter the hardness was determined to be Hv 1930 under a load of 1 kg. It was also confirmed that the scratch hardness was approximately equal to that of a synthetic ruby.

Since a deep crimson color is taken as the standard color of a bearing or the like in a timepiece, the amount of admixed chrome oxide was taken as 2 wt % with respect to the alumina. In the absence of chrome oxide the product would be colorless. While slightly less than 2 wt % would give a pink color and more than 2 wt % would give a deeper red. The color tone can thus be freely adjusted by varying the amount of chrome oxide which is to be added.

In accordance with the present invention the useful amounts of the oxide compositions are as follows.

If 0.2 wt % of chrome oxide is admixed with alumina an extremely pale pink color is obtained less than this amount of chrome oxide does provide sufficient coloring. Approximately 2 wt % is suitable for obtaining the standard deep crimson color. More than 3.5 wt % gives a deep red color which reduces light transmittance. The effective range of chrome oxide in the composition is therefore from 0.2 to 3.5 wt %.

If magnesium oxide coexists in the composition along with chrome oxide, the particle growth inhibiting effect upon the alumina particles is not particularly great if the amount of the magnesium oxide added is less than 0.04 wt % with respect to the alumina. On the other hand, it has been observed that more than 1.5 wt % of magnesium oxide tends to increase the occurence of flaws during the polishing step. The optimum amount is 0.1 to 0.2 wt %, and the useful range of the magnesium oxide in the composition is from 0.04 to 1.5 wt %.

It can be clearly understood from FIGS. 2A and 2B that a composition which includes strontium oxide in addition to the chrome oxide and magnesium oxide provides a far greater alumina particle growth inhibiting effect than a composition which includes the chrome oxide and magnesium oxide alone. It is believed that the particle growth inhibiting effect is due to the formation of $3SrO, 16Al_2O_3$ resulting when the strontium oxide is segregated on the alumina particle boundaries. It has been observed, however, that less than 0.1 wt % of strontium oxide diminishes the growth inhibiting effect, while more than 1.0 wt % leads to an increase in the amount of crystalization and thus reduces light transmittance. The optimum amount is 0.25 to 0.30 wt %, and the useful range in the composition is 0.1 to 1.0 wt %.

A method of manufacturing a light-transmitting polycrystal alumina article in accordance with the present invention is as follows.

As the alpha alumina ($\alpha$-$Al_2O_3$) it is desirable to make use of alumina ($Al_2O_3$) having a purity of at least 99.99%. This will serve as the principal raw material. Instead of the alpha alumina it is permissible to make use of an aluminum salt, namely a sulfate or nitrate, but in this case the gamma alumina ($\gamma$-$Al_2O_3$) produced upon perfiring should be converted to alpha alumina in advance. If the gamma alumina is used as is, the bulk specific gravity will be small, a high-density product difficult to obtain, and the light transmitting property will not be sufficient. The alumina particle diameter should be $2\mu$ or less. The chrome oxide, magnesium oxide and strontium oxide are in the form of metallic oxides but can also be employed in the form of sulfates or nitrates. As for purity only first class reagents should be used.

To manufacture the light-transmitting polycrystalline alumina body according to the present invention, chrome oxide, magnesium oxide and strontium oxide are weighed and added to 100 parts of high-purity alumina powder in accordance with the wt % ratios specificed above. The material is then sufficiently mixed in a ball mill or, if the amount is small, in a beaker to provide a uniform composition. The uniform composition can be more easily prepared if a small amount of the raw material is pulverized beforehand in a mortor together with a portion of the alumina, followed by blending in and mixing the remaining portion of the alumina. The standard ratios of each component of the final composition are as follows. The ratios of each of the oxides are expressed in wt % with respect to the alumina.

alumina . . . 100
chrome oxide . . . 1.8–2.0
magnesium oxide . . . 0.1–0.2
strontium oxide . . . 0.25–0.30

As in the case of ordinary powder molding the composition is added with a suitable organic binder and granulated. In an actual experiment 3 to 3.5 wt % of acry/base was used as the binder and the composition was granulated to a mesh size of 100 to 150 mesh.

After granulation the mixture is placed in a mold and pressed to form a compact having a prescribed shape. The amount of pressure is not particularly limited but should be capable of providing a bulk specific gravity of at least 3.0. In an experiment compacting was performed with an applied pressure of 3 to 5 ton/cm². After burning-off of the binder the bulk specific gravity was approximately 4.0 as measured by the Archimedian method using alcohol.

It is best to burn-off the binder from the compacted article before the primary firing step. In an experiment this burning-off was accomplished by placing the compacted article in an ordinary electric oven for 3 hours at 700° C. Once the binder has been burned off the article may be extracted from the oven and cooled before raising the temperature to accomplish the primary firing. However, heating up to the firing temperature need not be preceded by the extraction and cooling of the article. Primary firing is accomplished in an oxygen-containing atmosphere, in which the compacted article is fired for from 1 to 3 hours at 1000° C. or more, usually 1100° C. to 1200° C. At the stage following completion of perfiring the compacted article is usually reddish-white in color and exhibits absolutely no light-trasmitting property although it does possess sufficient strength for handling. Secondary firing is performed in an environment selected from the group consisting of vacuum and hydrogen atmosphere at 1600° C., but pereferably at more than 1650° C., until the light-trasmitting property appears. In an experiment, use was made of an electric oven through which ammonia cracked gas was passed. The first sign of transparency appeared after 2 hours of firing at 1610° C., and the light-transmitting stage was obtained in approximately 40 hours. The time required to obtain the light-transmitting state was shortened to 16 hours by firing at 1650° C. and to 12 hours at 1780° C. The rate of temperature increase during firing was 200° to 400° C./hour and was found to be suitable.

A number of expermiments were conducted as will now be described.

EXAMPLE I

Using a beaker 2.0 g of finely divided powder of chrome oxide, 0.21 g of finely divided powder of magnesium oxide and 0.25 g of finely divided powder of strontium oxide were weighted and mixed in a ball mill with 100 g of finely divider powder of high-purity alumina for 24 hours. In this case a small amount of the alumina powder was weighed out in advance and sufficiently mixed together with the chrome oxide powder and magnesium oxide powder using an alumina mortor and pestle. This mixture was then added to the ball mill. Following mixing, 3 wt % of acry/base solution was added to the composition which was then granulated to a predetermined small size of for example, 100 mesh. The granulated material was subsequently compacted at an applied pressure of approximately 5 ton/cm² to provide a disk having a diameter of 10 mm and a thickness of about 0.6 mm. The compact article was placed in an alumina boat and then, using an ordinary electric tube furnace, was heated for 2 hours at 700° C. to burn off the binder and then for 3 hours at 1100° C. for primary firing. The primarily fired article was reddish-white in color and was not transparent. The article was then subjected to secondary firing at 1650° C. for 24 hours using the electric tube furnace through which ammonia cracked gas was passed. The finally fired article was ruby red in color and light-transmitting. The rate of contraction of the outside diameter was 16%. Upon polishing both surfaces the thickness of the article was approximately 0.43 mm, and the light transmittance was measured by a Hitachi EPU-2 model spectrophotometer. The results are shown in Table 1.

EXAMPLE II

Together with 100 g of high-purity alumina powder were mixed 1.8 g of chrome oxide, 0.22 g magnesium oxide and 0.50 g of strontium oxide. Firing was carried out as in the EXAMPLE I except that primary firing was conducted at 1200° C. for 1 hour using a box-shaped electric oven that utilized a silicon carbide heating element. The fired product was ruby red in color and light-transmitting. Contraction was approximately 17%. The results are shown in Table 1.

REFERENCE EXAMPLE

Using a beaker 2.0 g of chrome oxide and 0.10 g of magnesium oxide were weighed and mixed in a ball mill with 100 g of high purity alumina powder for 24 hours.

Firing was carried out as in the EXAMPLE I The fired body was ruby red in color and light-transmitting. Rate of contraction was approximately 19%. The aricle was polished as in the EXAMPLE I and the light-transmittance was measured. The results are shown in Table 1.

TABLE I

| Experiment No. | Composition wt % | | | | Primary firing | Secondary firing |
|---|---|---|---|---|---|---|
| | $Al_2O_3$ | $Cr_2O_3$ | MgO | SrO | °C. × hr | °C. × hr |
| REFERENCE | 100.0 | 2.01 | 0.01 | — | 1100 × 3 | 1650 × 24 |
| EXAMPLE-I | 100.0 | 2.01 | 0.21 | 0.25 | 1100 × 3 | 1650 × 24 |
| EXAMPLE-II | 100.0 | 1.80 | 0.22 | 0.50 | 1200 × 1 | 1650 × 24 |

| Experiment No. | Vickers Hardness (1 kg Load) | In-line Transmittance | | | Color |
|---|---|---|---|---|---|
| | | 340 mμ | 480 mμ | 700 mμ | |
| REFERENCE | 1870 | 12 | 14 | 16 | Ruby red |
| EXAMPLE-I | 1900 | 18 | 20 | 22 | Same as above |
| EXAMPLE-II | 1930 | 21 | 22 | 24 | Same as above |

In accordance with the present invention it is possible to manufacture high-density, light-transmitting polycrystal alumina of sufficient hardness which can be used in place of a miniature ruby bearing. Since alumina powder can be used and molded into a prescribed shape with comparative ease, the present invention is effective in sharply reducing the cost of producing miniature bearing, particularly bearing pipes used in timepieces.

The gist of the present invention therefore resides in three points:

(1) 0.1 to 1.0 wt % of strontium oxide is added to alumina to inhibit the growth of crystals;

(2) Secondary firing can be accomplished at a comparatively low temperature of 1600° C.; and (3) Miniature bearings for use in timepieces or the like can be produced at very low cost.

What is claimed is:

1. A light-transmitting, polycrystalline alumina body consisting of $\alpha$-$Al_2O_3$ containing 0.1 to 1.0 weight percent of strontium oxide.

2. A light-transmitting, polycrystalline alumina body according to claim 1, further containing 0.04 to 1.5 weight percent of magnesium oxide in addition to 0.1 to 1.0 weight percent of said strontium oxide.

3. A light-transmitting, polycrystalline alumina body according to claim 1 or 2, further containing 0.2 to 3.5 weight percent of chrome oxide in addition to 0.1 to 1.0 weight percent of said strontium oxide.

* * * * *